United States Patent [19]

Kobayashi

[11] Patent Number: 4,518,243

[45] Date of Patent: May 21, 1985

[54] SHUTTER SPEED SETTING DEVICE FOR CAMERA

[75] Inventor: Takeo Kobayashi, Tokyo, Japan

[73] Assignee: Asahi Kogaku Kogyo Kabushiki Kaisha, Japan

[21] Appl. No.: 530,836

[22] Filed: Sep. 9, 1983

[30] Foreign Application Priority Data

Sep. 10, 1982 [JP] Japan ............................ 57-136578[U]

[51] Int. Cl.³ .......................... G03B 7/00; G03B 15/05
[52] U.S. Cl. ..................................... 354/418; 354/458
[58] Field of Search ...................... 354/418, 458, 127.1, 354/127.11, 127.12, 289.1, 474, 475, 289.12

[56] References Cited

U.S. PATENT DOCUMENTS

| | | | |
|---|---|---|---|
| 4,021,824 | 5/1977 | Uchiyama et al. | 354/418 |
| 4,225,218 | 9/1980 | Numata | 354/418 |
| 4,244,643 | 1/1981 | Tokutomi | 354/458 |
| 4,345,826 | 8/1982 | Takahashi et al. | 354/458 |

*Primary Examiner*—William B. Perkey
*Attorney, Agent, or Firm*—Sughrue, Mion, Zinn, Macpeak, and Seas

[57] ABSTRACT

A shutter speed setting device for a camera having a signal generator for providing an output in correspondence to the setting of a shutter speed to be set and a shutter speed setting circuit for providing a signal corresponding with a shutter speed in response to an output from the signal generator. A flash unit is connected to the shutter speed setting circuit and is controlled with a shutter speed equivalent to a flash synchronization speed. A charge completion signal conversion circuit converts into a predetermined signal a charge completion signal from the flash unit which represents whether or not said flash unit is energized for use. The shutter speed setting circuit operates so that when, in the case where said flash unit is charged and the charge completion signal is provided, a preset shutter speed is higher than the flash synchronization speed, setting a shutter speed higher than said synchronization speed is inhibited in a new shutter speed setting operation with the signal generator. When the preset shutter speed is lower than the flash synchronization speed, a new shutter speed can be set as desired until the new shutter speed reaches the flash synchronization speed.

5 Claims, 2 Drawing Figures

SHUTTER SPEED SETTING DEVICE FOR CAMERA

BACKGROUND OF THE INVENTION

This invention relates to a shutter speed setting device for a camera.

In the case where photography is carried out with a flash unit coupled to a camera such as in a shutter speed priority system camera or a manual system operation camera both having a mode of operation allowing a photographer to set shutter speed as desired, because of the photographer's compositional intention to utilize external light in addition to a flash unit photography is often performed after the preset shutter speed has been changed to a new shutter speed which is lower than the flash synchronization speed. That is, when the flash unit is ready for use and the preset shutter speed is higher than the flash synchronization speed, photography is carried out by the camera at the flash synchronization speed irrespective of the intended new shutter speed setting operation. When, on the other hand, the preset shutter speed is lower than the flash synchronization speed, photography is performed with the newly set lower shutter speed.

However, since conventional cameras have no means for controlling the shutter speed setting operation, shutter speeds in all the ranges may sometimes be set even when, in the case where the flash unit is ready for use, the preset shutter speed is higher than the flash synchronization speed. This is a completely useless operation, resulting in an improper exposure due to a lack of synchronization.

SUMMARY OF THE INVENTION

In view of the above-described difficulty with the prior art, an object of the invention is to provide a shutter speed setting device for a camera, in which, when the flash unit is ready and a shutter speed to be set is higher than a preset shutter speed which is higher than the flash synchronization speed, the setting of the new shutter speed is automatically inhibited.

This and other objects of this invention are accomplished by a shutter speed setting device for a camera, which comprises: a signal generator for providing an output in correspondence to the setting of a shutter speed to be set; a shutter speed setting circuit for providing a signal corresponding with a shutter speed in response to an output from said signal generator; a flash unit connected to said shutter speed setting circuit and controlled with a shutter speed equivalent to a flash synchronization speed; and a charge completion signal conversion circuit for converting into a predetermined signal a charge completion signal from said flash unit which represents whether or not said flash unit is ready for emitting light. The shutter speed setting circuit is designed so that when, in the case where said flash unit is ready for emitting light with said charge completion signal provided, a preset shutter speed is higher than the flash synchronization speed, setting a shutter speed higher than said synchronization shutter speed is inhibited in a new shutter speed setting operation with said signal generator, and when, in the same case, said preset shutter speed is lower than the flash synchronization speed, a new shutter speed can be set as desired until said new shutter speed reaches the flash synchronization speed.

BRIEF DESCRIPTION OF THE DRAWINGS

This invention will be described with reference to the accompanying drawings wherein.

DESCRIPTION OF THE PREFERRED EMBODIMENT

Figure 1:
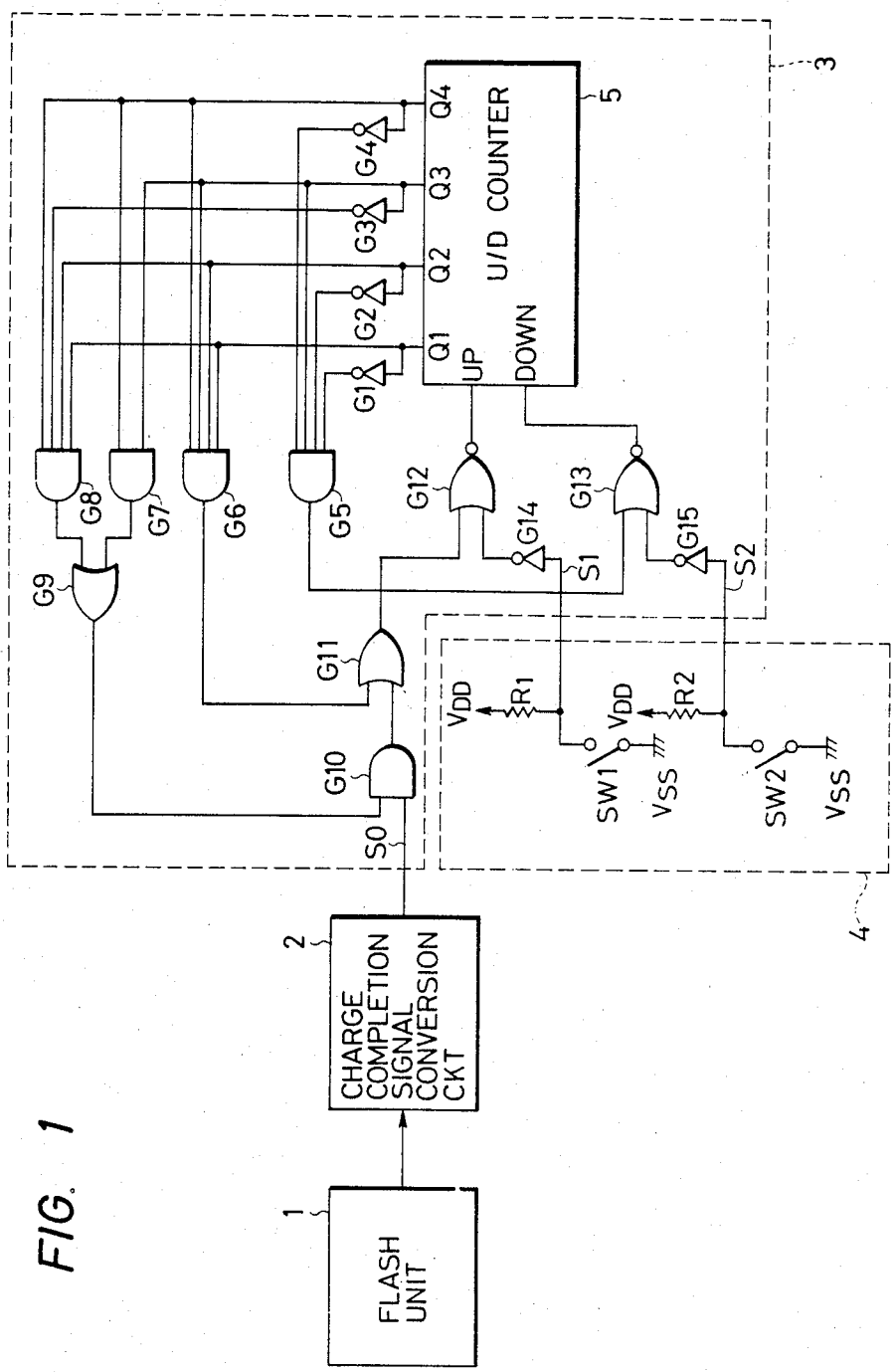
FIG. 1 is a block diagram showing one example of a shutter speed setting device according to this invention.
Figure 2:
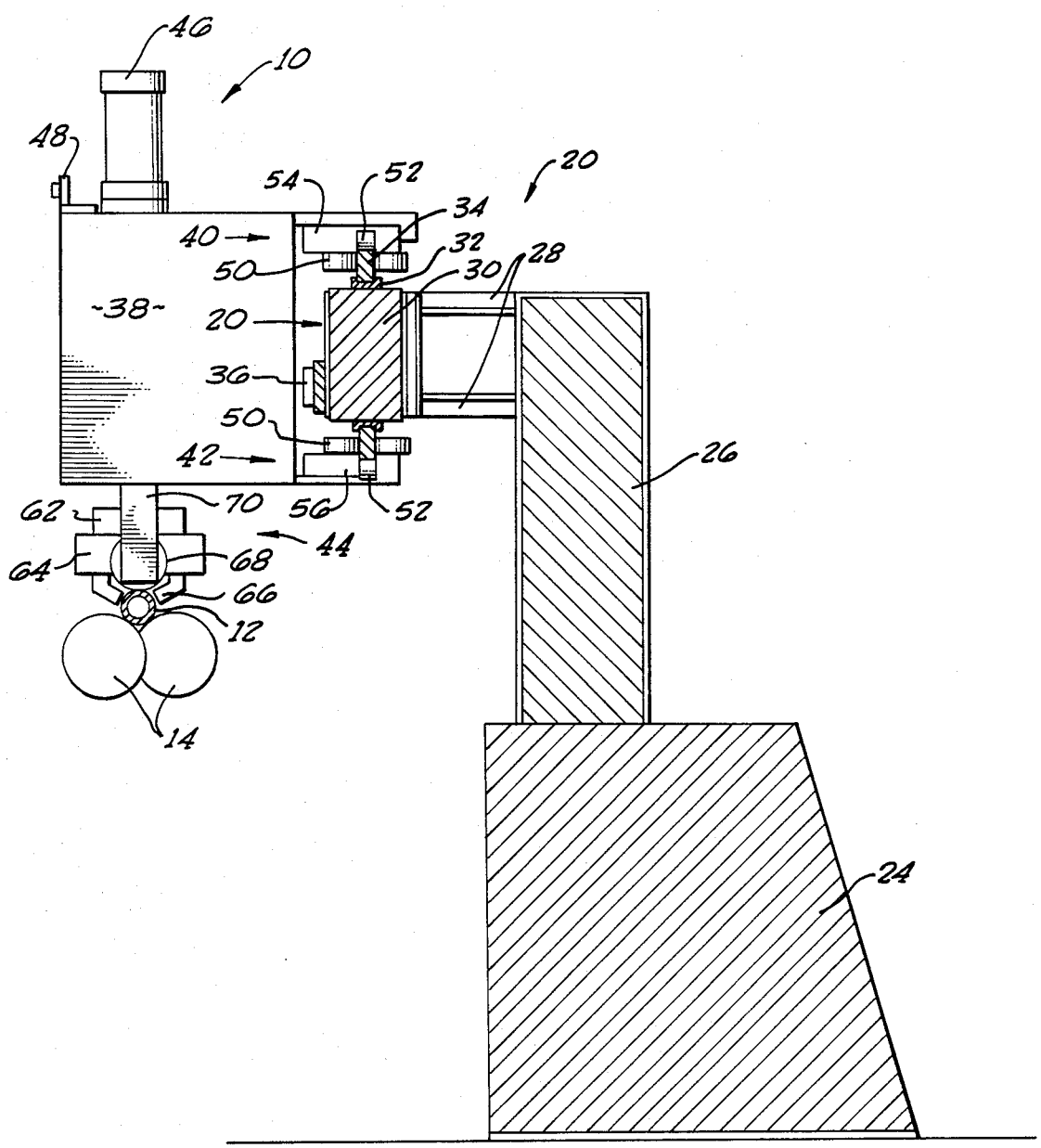
FIG. 2 is a table for a description of the operation of the device, showing set shutter speeds with corresponding signals.

FIGS. 1 and 2 show one example of a shutter speed setting device according to the invention. In these figures, reference numeral 1 designates a flash unit connected to the camera. The flash unit provides a charge completion signal indicating the fact that the capacitor has been charged as required for flashing. The signal is applied to a charge completion signal conversion circuit 2, where the level of the signal is changed to a predetermined value. More specifically, in circuit 2, the charge completion signal is raised to a high level (hereinafter referred to merely as "H", when applicable) when the flash unit 1 is ready for light emission; and the signal is set to a low level (hereinafter referred to merely as "L", when applicable) when the flash unit 1 is not ready for emission. The circuit 2 is connected to a shutter speed setting circuit 3. A digital signal generator 4 is coupled to the shutter speed setting circuit 3.

The shutter speed setting circuit 3 has an up/down counter 5. A first output terminal $Q_1$ of the counter 5 is connected through an inverter $G_1$ to a first input terminal of an AND gate $G_5$ and is connected to first input terminals of AND gates $G_6$ and $G_8$. A second output terminal $Q_2$ of the counter 5 is connected through an inverter $G_2$ to a second input terminal of the AND gate $G_5$ and is connected to second input terminals of the AND gates $G_6$ and $G_8$. A third output terminal $Q_3$ of the counter 5 is connected through an inverter $G_3$ to a third input terminal of the AND gate $G_8$ and is connected to third input terminals of the AND gates $G_5$ and $G_6$ and to a first input terminal of an AND gate $G_7$. A fourth output terminal of the counter 5 is connected through an inverter $G_4$ to a fourth input terminal of the AND gate $G_5$ and is connected to fourth input terminals of the AND gates $G_6$ and $G_8$ and to a second input terminal of the AND gate $G_7$.

The output terminals of the AND gates $G_7$ and $G_8$ are connected to the input terminals of an OR gate $G_9$, the output terminal of which is connected to a first input terminal of an AND gate $G_{10}$, to a second input terminal of which the output signal SO of the charge completion signal conversion circuit 2 is applied. The output terminal of the AND gate $G_6$ is connected to a first input terminal of an OR gate $G_{11}$, a second input terminal of which is connected to the output terminal of the AND gate $G_6$. The output terminal of the OR gate $G_{11}$ is connected to a first input terminal of a NOR gate $G_{12}$, the output terminal of which is connected to the "up" input terminal UP of the up/down counter 5. The output terminal of the AND gate $G_5$ is connected to a first input terminal of a NOR gate $G_{13}$, the output terminal of which is connected to the "down" input terminal DOWN of the up/down counter 5.

The digital signal generator 4 comprises two switches $SW_1$ and $SW_2$ the first terminals of which are connected to a low potential power source $V_{ss}$. The other terminals of the switches SW$_1$ and SW$_2$ are connected respectively through resistors R$_1$ and R$_2$ to a high potential power source V$_{DD}$. The digital signal generator 4 thus organized outputs a signal S$_1$ which is set to "L" when the switch SW$_1$ is closed, and which is raised to "H" when the switch SW$_1$ is opened. Furthermore, the generator 4 outputs a signal S$_2$ which is set to "L" when the switch SW$_2$ is closed, and which is raised to "H" when it is opened. The signal S$_1$ is supplied through an inverter G$_{14}$ to a second input terminal of the NOR gate G$_{12}$ in the shutter speed setting circuit 3. The signal S$_2$ is supplied through an inverter G$_{15}$ to a second input terminal of the NOR gate G$_{13}$.

Thus, when the switch SW$_1$ is closed, the fall of the signal S$_1$ is applied through the NOR gate G$_{12}$ to the "up" input terminal UP of the up/down counter 5, so that the counter value of the counter 5 is increased by one. When the switch SW$_2$ is closed, the fall of the signal S$_2$ is applied through the NOR gate G$_{13}$ to the "down" input terminal DOWN of the up/down counter 5, so that the content of the latter is decreased by one. Accordingly, if count values of the up/down counter 5 are made representative of shutter speeds, a desired shutter speed can be set by operating the switches SW$_1$ and SW$_2$. More specifically, as shown in FIG. 2, count values in binary notation are provided in correspondence with shutter speeds: for instance 0 1 0 0 for a shutter speed set value 1 (1 sec), 0 1 0 1 for a shutter speed set value 2 (½ sec) and 1 1 1 1 for a shutter speed set value 2000 (1/2000 sec).

The count value of the up/down counter 5 is decoded by the inverters G$_1$ through G$_4$, the AND gates G$_5$ through G$_8$ and the OR gate G$_9$. The output of the AND gate G$_5$ is set to "L" except when the shutter speed set value is 1 (or the count value is 0 1 0 0). The output of the AND gate G$_6$ is set to "L" except when the set value is 2000 (or the count value is 1 1 1 1). The output of the OR gate G$_9$ is raised to "H" when the set value is higher than 125 (or the count value is higher than 1 0 1 1).

When the switch SW$_2$ is operated, the shutter speed set value is decreased by the fall of the signal S$_2$. When the set value is decreased to 1 (or the count value 0 1 0 0), the output of the AND gate G$_5$ is raised "H", and therefore the output of the NOR gate is maintained at "L". Accordingly, the count value 0 1 0 0 of the up/down counter 5 remains unchanged. It is inhibited to further decrease the set value. (In FIG. 2, symbol × indicates that setting is inhibited and symbol ⊙ indicates that setting is permitted.)

On the other hand, when the switch SW$_1$ is operated, the shutter speed set value is increased by the fall of the singal S$_1$; however, when the flash unit 1 is not ready for use, the signal SO is at "L", and therefore the output of the AND gate G$_{10}$ is set to "L". Therefore, when the shutter speed is set to 1/2000 sec., the output of the AND gate G$_6$ is maintained at "H", the count value of the up/down counter 5 maintained at 1 1 1 1, and accordingly is is not permitted to increase the shutter speed set value. When, on the other hand, the flash unit 1 is ready for emission, the signal SO is at "H", and therefore the level of the output of the OR gate G$_{11}$ is determined by the levels of the outputs of the OR gate G$_9$ and the AND gate G$_6$. As a result, the output of the NOR gate G$_{12}$ is held at "L" and therefore it becomes impossible to set the shutter speed to a value higher than 1/125 second, i.e., the flash synchronization speed.

As is apparent from the above description, when the flash unit 1 is not ready for light emission, shutter speeds in all the ranges can be set. When, on the other hand, the flash unit 1 is ready for light emission, a shutter speed can be set to any value lower than the flash synchronization speed but the operator is prevented from setting a shutter speed higher than the flash synchronization speed.

As is clear from the above description, in the shutter speed setting device for a camera which comprises: the digital signal generator for providing an output in correspondence to a shutter speed to be set; the shutter speed setting circuit for providing a signal according to a shutter speed in response to the output of the signal generator; the flash unit connected to the shutter speed setting circuit and controlled with a shutter speed equivalent to the flash synchronization speed; and a charge completion signal conversion circuit for converting into a predetermined signal a charge completion signal from the flash unit which represents whether or not the flash unit is charged and ready for light emission. According to the invention, the shutter speed setting circuit is designed so that, when the flash unit is ready for use with the charge completion signal received, a preset shutter speed higher than the flash synchronization speed, is inhibited. When the preset shutter speed is lower than the flash synchronization speed, the operator is permitted to set a new shutter speed until it reaches the flash synchronization speed. Thus, the shutter speed setting device can be effectively applied to shutter speed priority or manual operation cameras.

I claim:

1. A shutter speed setting device for a camera comprising:
   a signal generator for providing an output corresponding to the setting of a shutter speed to be set;
   a shutter speed setting circuit for providing a signal corresponding with a shutter speed in response to an output from said signal generator;
   a flash unit connected to said shutter speed setting circuit and controlled with a shutter speed equivalent to a flash synchronization speed;
   a charge completion signal conversion circuit for converting into a predetermined signal a charge completion signal from said flash unit which represents whether or not said flash unit is ready for use;
   wherein, when said flash unit is ready for use and said charge completion signal is provided and a preset shutter speed is higher than the flash synchronization speed, said shutter speed can be set to speeds lower than said preset shutter speed, including shutter speeds higher than said flash synchronization shutter speed, and when said preset shutter speed is lower than the flash synchronization speed, a new shutter speed can be set as desired, either lower than said preset shutter speed or higher than said preset shutter speed until said new shutter speed reaches the flash synchronization speed.

2. The device of claim 1 wherein said charge completion signal coversion circuit converts said charge completion signal into one of two predetermined levels, one of said predetermined levels representing said flash being charged and ready for use and the other of said predetermined levels representing flash being not ready for use.

3. The device of claim 1 wherein said signal generator comprises a pair of switches, each connected to a low potential power source and high potential power source wherein said signal generator produces a pair of digital output signals, each output signal at a high or low value depending on the switching state of said pair of switches and representative of the shutter speed set.

4. The device of claim 1 wherein said shutter speed setting circuit comprises;
 a first logic circuit receiving the outputs of said charge completion signal conversion circuit and said signal generator to provide a pair of logical outputs and,
 an up-down counter receiving said logical outputs and producing a result digital count value; and
 a second logic circuit for decoding the result digital count value and providing second inputs to said first logic circuit.

5. A shutter speed setting device for a camera, comprising:
 flash signalling means for generating a flash ready signal indicating that a flash unit is ready for use;
 a signal generator for selectively generating first and second signals;
 a counter for counting in a first direction to increase its count value in response to said first signals and for counting in a second direction to decrease its count value in response to said second signals, an output of said counter representing a set shutter speed; and
 count disabling means, coupled to said flash signalling means and said counter, for inhibiting counting in said second direction in response to a first predetermined value of said counter output, for inhibiting counting in said first direction in response to a second predetermined value of said counter output, and for inhibiting counting in said first direction in response to said flash ready signal and a third predetermined value of said counter output intermediate said first and second predetermined values.

* * * * *